United States Patent Office 3,518,292
Patented June 30, 1970

---

3,518,292
QUATERNARY PHOSPHONIUM SILICON COMPLEXES
Cecil L. Frye, Midland, Mich., assignor to Dow Corning Corporation, Midland, Mich., a corporation of Michigan
No Drawing. Filed Mar. 27, 1967, Ser. No. 625,965
The portion of the term of the patent subsequent to Dec. 26, 1984, has been disclaimed
Int. Cl. C07f 7/06
U.S. Cl. 260—448.8                 5 Claims

ABSTRACT OF THE DISCLOSURE

The title complexes of the formula are claimed. These complexes are useful as catalysts for the preparation of siloxane polymers having a narrow molecular weight distribution.

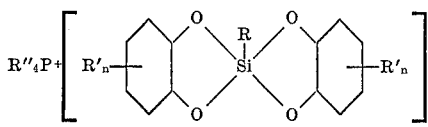

wherein
R is a monovalent hydrocarbon or monovalent aliphatic halohydrocarbon radical,
R' is a substituent that activates the aromatic ring,
n is an integer from 0 to 2, and
R" is a monovalent hydrocarbon radical

---

This invention relates to new quaternary phosphonium silicon complexes that are useful as catalysts for the preparation of siloxane polymers having a narrow molecular weight distribution.

More specifically, this invention relates to a quaternary phosphonium silicon complex having the general formula

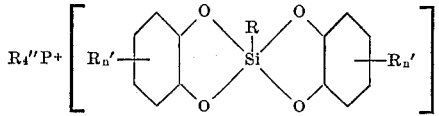

wherein
R is a monovalent hydrocarbon or monovalent aliphatic halohydrocarbon radical,
R' is a substituent that activates the aromatic ring,
n is an integer from 0 to 2, and
R" is a monovalent hydrocarbon radical.

In the above formula R can be any monovalent hydrocarbon or monovalent aliphatic halohydrocarbon radical. Thus R can be, for example, a methyl, ethyl, propyl, butyl, amyl, hexyl, heptyl, octyl, monyl, decyl, dodecyl, octadecyl, vinyl, allyl, ethynyl, cycohexyl, phenyl, tolyl, benzyl, 3-chloropropyl or a 3,3,3-trifluoropropyl radical.

The R' substituent in the above formula can be any substituent that releases electrons or activates the aromaitc ring. Specific examples of R' includes the methyl, ethyl, propyl, butyl, amyl, hexyl, cyclohexyl, phenyl, amino, hydroxyl and methoxy groups. There can be zero, one or two R' substituents on the aromatic ring, i.e. $n$ is an integer from 0 2. Preferably $n$ is zero.

The R" radical can be any monovalent hydrocarbon radical. Thus R" can be, for example, a methyl, ethyl, propyl, butyl, amyl, hexyl, heptyl, octyl, decyl, dodecyl, octadecyl, myricyl, vinyl, allyl, hexenyl, ethynyl, cyclohexyl, cyclohexenyl, phenyl, xenyl, naphthyl, tolyl, xylyl, benzyl or a phenylethyl radical.

The complexes of this invention are prepared by reacting one mole of $RSi(OR''')_3$, wherein R''' is an alkyl radical containing from 1 to 4 carbon atoms with two moles of catechol or a substituted catechol of the formula

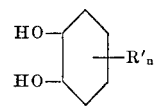

and at least one mole of a quaternary phosphonium hydroxide of the formula $R''_4POH$. The quaternary phosphonium hydroxide can be used per se or generated in situ from the corresponding halide and appropriate base. The reaction of the three ingredients proceeds upon their being mixed and heated. While heating of the mixture is generally preferred, frequently the reaction will proceed satisfactorily at room temperature.

EXAMPLE 1

To a one ounce vial there was added 2.01 g. of tetrabutylphosphonium bromide, 1.1 g. of catechol, 1 g. of phenyltrimethoxysilane and 5 ml. of 1 N methanolic potassium hydroxide. The potassium bromide formed was filtered off and the filtrate diluted with an equal volume of isopropanol whereupon a crystalline solid precipitated. Filtration and evacuation to constant weight yield 1.5 g. of impure product. This product was taken up in tetrahydrofuran, filtered to remove impurities, believed to be potassium bromide, and then reprecipitated by diluting with hexane. This recrystallized product was found to have a neutral equivalent of 587 as compared to the theoretical value of 580, and the structure

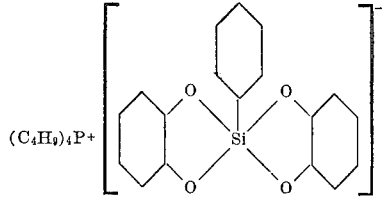

EXAMPLE 2

When the following quaternary phosphonium hydroxides and silanes are substituted, respectively, for the tetraphosphonium hydroxide and phenyltrimethoxysilane of Example 1 in equivalent amounts, the indicated products are obtained.

| Hydroxide | Silane | Product |
|---|---|---|
| $C_6H_5CH_2(CH_3)_3POH$ | $C_6H_5Si(OCH_3)_3$ | $C_6H_5CH_2(CH_3)_3P^+$ |

| Hydroxide | Silane | Product |
|---|---|---|
| $(CH_3)_4POH$ | $C_6H_5CH_2Si(OCH_3)_3$ | $(CH_3)_4P^+$ [catechol-Si complex with CH$_2$C$_6$H$_5$ group]$^-$ |
| $CH_2=CH(C_3H_7)(CH_3)_2POH$ | $CH_3Si(OC_3H_7)_3$ | $CH_2=CH(C_3H_7)(CH_3)_2P^+$ [catechol-Si complex with CH$_3$ group]$^-$ |
| $C_{18}H_{37}(CH_3)_2POH$ (with thiophenyl group) | $CH_2=CHSi(OC_2H_5)_3$ | $C_{18}H_{37}(CH_3)_2P^+$ (with thiophenyl group) [catechol-Si complex with CH=CH$_2$ group]$^-$ |
| $CH_3C_6H_4(CH_3)_3POH$ | $CF_3CH_2CH_2Si(OCH_3)_3$ | $CH_3C_6H_4(CH_3)_3P^+$ [catechol-Si complex with CH$_2$CH$_2$CF$_3$ group]$^-$ |
| $(C_6H_5)_3CH_3POH$ | $CH_3C_6H_4Si(OCH_3)_3$ | $(C_6H_5)_3CH_3P^+$ [catechol-Si complex with C$_6$H$_4$CH$_3$ group]$^-$ |

EXAMPLE 3

When the following substituted catechols are substituted for the catechol of Example 1 in equivalent amounts, the indicated products are obtained.

| Catechol | Product |
|---|---|
| 3,4-dihydroxy-$(CH_3)_2$-benzene | $(C_4H_9)_4P^+$ [bis(dimethylcatechol)phenylsilicate]$^-$ |
| 3,4-dihydroxy-$C_6H_5$-benzene | $(C_4H_9)_4P^+$ [bis(phenylcatechol)phenylsilicate]$^-$ |
| 3,4-dihydroxy-OH-benzene | $(C_4H_9)_4P^+$ [bis(hydroxycatechol)phenylsilicate]$^-$ |

| Catechol | Product |
|---|---|
| 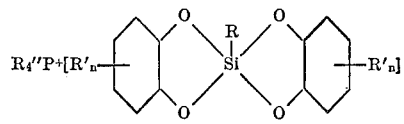 | 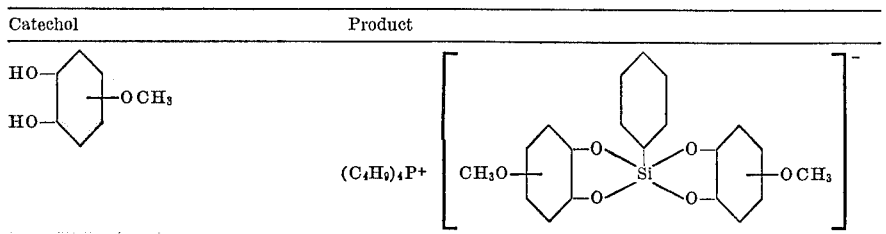 |

EXAMPLE 4

To 3 g. of hexamethylcyclotrisiloxane and 3 g. of toluene there was added a trace of the catalyst prepared in Example 1 and a few drops of dimethylsulfoxide to dissolve the catalyst. This mixture was heated at 65° C. for two days to yield a very viscous, linear polydimethylsiloxane. Gel-permeation chromatography showed that no cyclic tetramer, pentamer or hexamer was present in the product. The range of molecular weights of the species present in the product was narrow.

That which is claimed is:

1. A quaternary phosphonium silicon complex having the general formula $$R_4''P^+[R'_n\text{—}\underset{\underset{O}{|}}{\overset{\overset{O}{|}}{\underset{}{Si}}}\text{—}R'_n]$$

wherein

R is a monovalent hydrocarbon or monovalent aliphatic halohydrocarbon radical,
R' is a substituent that activates the aromatic ring,
$n$ is an integer from 0 to 2, and
R'' is a monovalent hydrocarbon radical.

2. A complex as defined in claim 1 wherein $n$ is zero.
3. A complex as defined in claim 2 wherein R is a phenyl radical.
4. A complex as defined in claim 3 which has the formula

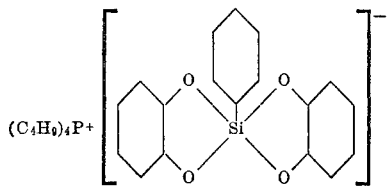

5. A complex as defined in claim 3 which has the formula

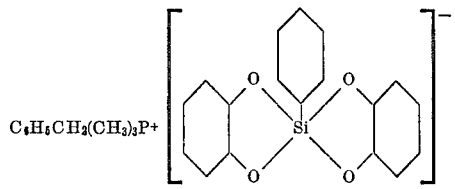

References Cited

UNITED STATES PATENTS

| | | | |
|---|---|---|---|
| 3,355,477 | 11/1967 | Frye | 260—448.8 |
| 3,360,525 | 12/1967 | Frye | 260—448.8 X |

TOBIAS E. LEVOW, Primary Examiner

P. F. SHAVER, Assistant Examiner

U.S. Cl. X.R.

260—46.5